United States Patent [19]

Najarian

[11] 3,841,002

[45] Oct. 15, 1974

[54] READING-TRAINING DEVICES

[76] Inventor: Nishan J. Najarian, 8 Arrowhead Rd., Convent Station, N.J. 07961

[22] Filed: Jan. 23, 1974

[21] Appl. No.: 435,702

[52] U.S. Cl. .................................................. 35/35 B
[51] Int. Cl. ........................................... G09b 17/04
[58] Field of Search ............. 35/35 B, 35 C; 40/341, 40/352, 353, 356

[56] References Cited

UNITED STATES PATENTS

| | | | |
|---|---|---|---|
| 2,919,500 | 1/1960 | Simpson et al. | 35/35 B |
| 3,521,007 | 7/1970 | Laghaie | 35/35 C X |
| 3,659,357 | 5/1972 | Martinesco et al. | 35/35 C |
| 3,707,785 | 1/1973 | Reed et al. | 35/35 C |

*Primary Examiner*—Wm. H. Grieb
*Attorney, Agent, or Firm*—Popper, Bain, Bobis, Gilfillan & Rhodes

[57] ABSTRACT

A reading-training device wherein a mask moves progressively to cover successive lines from the top to the bottom of a page of printed matter; contemporaneously with the movement of the mask, a visible index moves from one side of the mask to the other to pace the speed of reading each line.

4 Claims, 2 Drawing Figures

READING-TRAINING DEVICES

BACKGROUND OF INVENTION

This invention relates to reading-training devices generally and particularly to such devices wherein the pace of reading is governed by a mask immediately preceding the line being read and in addition an index moving across each line to pace the speed of reading particular lines.

DESCRIPTION OF THE PRIOR ART

Numerous reading pacers are available which govern the speed of reading successive lines by masking an immediately preceding line in order to force the reader to read a line before it is obscured by the pacer. For example the reading-training device shown in U.S. Pat. No. 2,919,500 of Jan. 5, 1960, and the references cited therein. Reading problems may arise from the laggard reader whose eyes do not scan a single individual line being read with sufficient rapidity to complete the line before the mask obscures it. There are no index devices to govern the reading rate horizontally in a single line but only a mask moving from the top of the page to the bottom of the page. It has been found that the stimulus provided by a pointer or index to guide the eyes over a single line of text creates a reading habit that tends to accomplish a smooth and intelligent transit from one end of the line to the other, minimizing the amount of pausing for understanding within the line so that the eye of the reader is paced within the line from one end to another. The ability to read rapidly with understanding of the text is increased by the use of the smooth traversal of a line being read by the index so that the tendency to dwell on individual words or groups of words is reduced with the understanding of the reader that effort should be expended to scan a line at the speed at which the horizontal pacer or index moves. The combination of the top to bottom pacer or mask, with the horizontal pacer or index accomplishes the establishment of rapid reading habits of behavior and understanding of the printed word.

SUMMARY OF THE INVENTION

The present invention may be applied to any of the numerous reading-training devices which have only a mask, such as the above mentioned patented invention. A mask and drive means for the mask, causing it to move from the top to the bottom of the text is a conventional construction. The present invention adds to the movable mask a gear normally engaged with a rack, so that as the mask moves, the gear is driven. A gear train causes movement of a pulley. The pulley drives a belt. An index mounted on the belt protrudes beyond the mask, and serves to pace the reader horizontally in reading the line from one end to the other, while the mask serves to pace the reader from one line to the next succeeding line.

In this manner, not only is the reader compelled to read lines rapidly from top to bottom of the page so that he will be ahead of the obscuring mask, but the reader is also led to read along the entire length of the line by the index moving along each line at a speed sufficient to reach the end of each line, before the mask obscures the line, and render it beyond reading.

THE DRAWING

These objects and advantages as well as other objects and advantages may be obtained by the device shown by way of illustration in the drawing in which.

DESCRIPTION OF A PREFERRED EMBODIMENT

Figure 1:
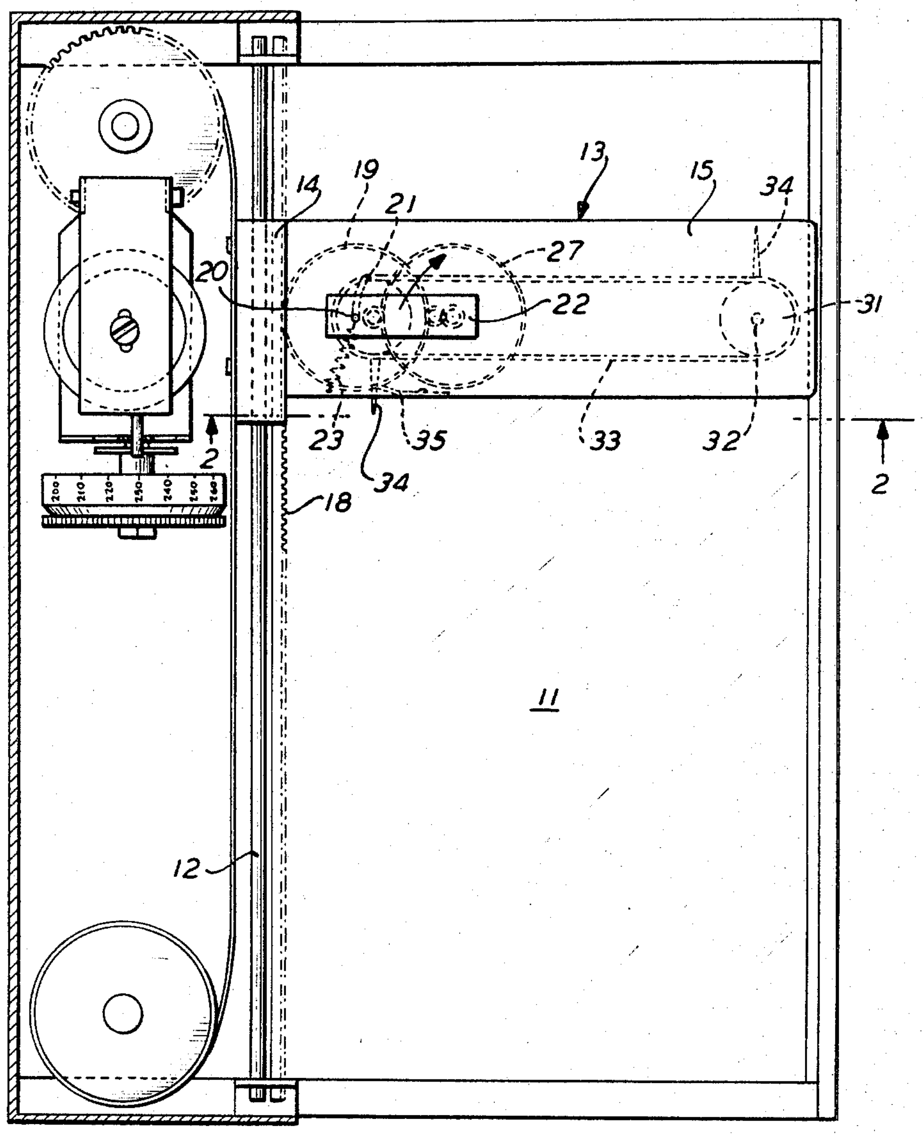
FIG. 1 is a top plan view of my reading-training device.
Figure 2:
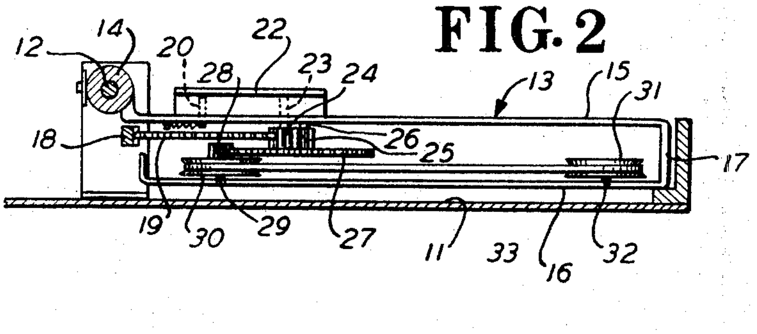
FIG. 2 is a partial vertical sectional view taken on the line 2 looking in the direction of the arrow.

Referring now to the drawings in detail, my invention provides a site 11 dimensioned to receive a page with lines of reading matter thereon. Immediately adjacent to this site is a rod 12, defining a track upon which a mask 13 is slidably mounted by being attached to a tubular member 14 slidably mounted on the rod 12. The mask 13 is a generally rectangular hollow body, having a top 15, and a bottom 16 connected together by an end wall 17. Immediately adjacent to one end of the mask 13 there is a rack 18. A gear 19 is positioned in the housing and is normally engaged with the rack 18. This gear is mounted on an axle 20 in such a manner that the gear 19 is free to rotate on the axle 20. The axle 20 passes through the top wall 15 of the housing through an arcuate slot 21. The axle 20 is attached to an elongated bar or thumb handle 22. The thumb handle 22 is pivotally mounted on a pivot pin 23, whereby when the mask 13 is to be returned to starting position at the top of the text, the handle 22 is pivoted (see arrow in FIG. 1) on the pin 23, and the gear 19 is disengaged from the rack 18. The mask 13 is then free to move to the top of the text for the start of pacing movement down the printed page on the site 11. By disengagement of the gear 19 from the rack 18 by pivoting the handle 22, the gear 19 will not rotate and rapidly reverse - drive the gear train as will subsequently be described.

The axle 19 is movable in the arcuate slot 21. A spring 23 is attached at one end inside of the housing 13 and the other end is attached to the axle 20, so that when the thumb handle 22 is released, the axle 20 is restored to normal position to restore the gear 19 to engagement with the rack 18. The shiftable gear 19 is engaged with and drives a first pinion 24. The first pinion 24 drives a second pinion 25. The first pinion 24 is mounted rotatably on the pin 23. The second pinion 25 is mounted rotatably on the axle 26. The second pinion 25 is attached to a large gear 27 which drives the small pinion 28. The small pinion 28 is mounted on axle 29 and the pinion is coaxially attached to a pulley 30. Another pulley 31 is mounted on an axle 32 in the mask 13. An endless belt 33 is carried by the pulleys 30, 31. Traverse pointers or indexes 34 are mounted on the belt 33. By reason of the gear train, the downward movement of the mask 13 over only one line of text is magnified so that the pointer 34 traverses the length of one entire line.

In this manner the movement of the mask provides a pacer for reading that obscures the horizontal lines successively and at the same time provides a succession of horizontally moving indexes to pace the eye movements along the line being read.

A leaf spring 35 is attached to the inside of the mask 13 and it engages the gear 19. This spring 35 serves as a latch to prevent the rotation of the gear 19 when it is disengaging from the rack 18, so that the index 34 will not be moved by the rack during disengagement of the gear 19 when the handle 22 is pushed to restore the mask 13 to starting position at the top of the site 11.

In operation, a reading-training text is placed on the site 11 and the handle 22 is pushed to restore the mask 13 to the top of the text. As the mask 13 moves as a vertical pacer of the text, the indexes 34 move as a horizontal pacer.

A means is provided to move the mask 13 from the top to the bottom on the site 11, at a controlled rate. The driving means for the mask is no part of the present invention and therefore will not be referred to in detail as it may be any of the well known reading-training devices such as the one described in detail in U.S. Pat. No. 2,919,500 above referred to. It is merely shown in the drawing for purposes of illustration.

What is claimed is:

1. A reading-training device comprising:

a. a mounting for a mask, b. a mask slidably attached to the mounting and defining a reading pacer that moves from the top to the bottom of a text to be read, c. a site for a text to be positioned under a portion of the mask, d. means normally driving the mask from the top to the bottom of the site, e. a rack positioned adjacent to the mask and in general parallelism to the plane defining the course over which the mask is driven, f. an axle passed through an arcuate slot in the mask, g. a first gear mounted on the axle in the mask, h. a spring attached to the mask and to the axle, and normally urging the axle to bring the first gear into engagement with the rack, i. a handle pivotably mounted on the mask and engaged with the axle whereby the pivotal movement of the handle overcomes the spring and disengages the first gear from the rack and permits the movement of the mask from the bottom to the top of the site, j. a gear train engaged at one end with the first gear, k. a first pulley operably connected to the other end of the gear train in the mask, l. a second pulley rotably mounted in the mask, m. the first and second pulleys positioned at opposite ends of the mask, n. a belt mounted on the pulleys, o. indexes attached to the belt, extending beyond the mask, and moving across each line of text on the site, as the mask moves to cover each line of text successively.

2. A reading-training device comprising:

a. the device according to claim 1 and, b. the gears of the gear-train proportioned to magnify the downward movement of the mask to provide a ratio of masks movement to index movement, sufficient to drive the index completely across one line of text for each line of text that the mask covers.

3. A reading-training device comprising:

a. the device according to claim 1 and, b. a means to support the opposite side of the mask from the mounting.

4. A reading-training device comprising:

a. the device according to claim 1 and, b. a leaf spring attached at one end to the mask and having its other end engaged with the first gear to hold the first gear against movement when the first gear is disengaged from the rack.

* * * * *